(12) United States Patent
Shirk et al.

(10) Patent No.: US 8,335,416 B2
(45) Date of Patent: Dec. 18, 2012

(54) CONNECTOR ASSEMBLY INCLUDING A FLOATABLE LIGHT PIPE ASSEMBLY

(75) Inventors: Michael Eugene Shirk, Grantville, PA (US); Michael J. Phillips, Camp Hill, PA (US); David S. Szczesny, Hershey, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 339 days.

(21) Appl. No.: 12/768,331

(22) Filed: Apr. 27, 2010

(65) Prior Publication Data
US 2011/0262074 A1    Oct. 27, 2011

(51) Int. Cl.
*G02B 6/26* (2006.01)
(52) U.S. Cl. ............................. 385/52; 385/32; 385/146
(58) Field of Classification Search .................. 385/146, 385/52, 135; 361/719; 439/490, 608
See application file for complete search history.

(56) References Cited

U.S. PATENT DOCUMENTS

| | | | |
|---|---|---|---|
| 7,249,966 B2 * | 7/2007 | Long | 439/541.5 |
| 7,390,212 B1 * | 6/2008 | Yang | 439/490 |
| 7,421,184 B2 | 9/2008 | Long | |
| 7,529,094 B2 | 5/2009 | Miller | |
| 7,575,471 B2 | 8/2009 | Long | |
| 7,601,021 B1 | 10/2009 | Yang | |
| 7,621,773 B2 | 11/2009 | Bright et al. | |
| 2005/0254772 A1 * | 11/2005 | Long et al. | 385/146 |
| 2006/0003632 A1 * | 1/2006 | Long | 439/608 |
| 2007/0253168 A1 * | 11/2007 | Miller | 361/719 |
| 2010/0111476 A1 * | 5/2010 | Shirk et al. | 385/53 |

* cited by examiner

*Primary Examiner* — Ellen Kim

(57) ABSTRACT

A connector assembly configured to be positioned relative to a light-emitting element. The connector assembly includes a receptacle connector that has a member cavity and a base. The connector assembly also includes a light pipe (LP) structure that has input and output ends. The input end is configured to capture light emitted from the light-emitting element. The connector assembly also includes an alignment member that is received within the member cavity of the receptacle connector and is coupled to the LP structure. The alignment member is sized to float within the member cavity to control a relative position of the input end of the LP structure with respect to the base.

20 Claims, 5 Drawing Sheets

US 8,335,416 B2

CONNECTOR ASSEMBLY INCLUDING A FLOATABLE LIGHT PIPE ASSEMBLY

BACKGROUND OF THE INVENTION

The invention relates generally to connector assemblies having light pipes, and more particularly to connector assemblies adapted to hold the light pipes in predetermined positions.

Connector assemblies may be configured to receive a pluggable or removable device and establish a communicative connection between the device and another device or system. For example, a connector that is configured to receive a small form-factor (SFP) pluggable transceiver may be mounted to a circuit board. In order to ensure that the connection has been properly made between the pluggable transceiver and the mounted connector, light pipe assemblies may be used. The light pipe assembly transmits light flashed by an indicator, such as a light emitting diode (LED), that is located on the circuit board. The light propagates to a viewable location to notify an operator that the connection has been properly made.

In order for a light pipe to transmit light from an LED, an input end of the light pipe must interface with or be positioned near the LED so that the input end may capture the emitted light. In one known connector assembly, a light pipe assembly directly engages a connector that is mounted to a circuit board. The light pipe assembly is configured so that the input ends are located near a base of the connector. The light pipe assembly includes engagement members such as lugs, hooks, or other projections that are inserted into and couple with holes or openings in the connector. However, such connector assemblies may be limited to use with particular LED configurations. Furthermore, the engagement members are typically smaller pieces that may break during assembly or require additional costs for molding. In addition, it may be difficult to manipulate the engagement members during the construction of the connector assembly.

Accordingly, there is a need for connector assemblies that can accommodate different configurations of LEDs. There is also a general need for connector assemblies that may be easier and less costly to assemble than known connector assemblies.

BRIEF DESCRIPTION OF THE INVENTION

In one embodiment, a connector assembly is provided that is configured to be positioned relative to a light-emitting element. The connector assembly includes a receptacle connector that has a member cavity and a base. The connector assembly also includes a light pipe (LP) structure that has input and output ends. The input end is configured to capture light emitted from the light-emitting element. The connector assembly also includes an alignment member that is received within the member cavity of the receptacle connector and is coupled to the LP structure. The alignment member is sized to float within the member cavity to control a relative position of the input end of the LP structure with respect to the base.

Optionally, the connector assembly may have a LP assembly that includes the LP structure and the alignment member. The LP structure may be a first LP structure and the connector assembly may also include a second LP structure. The first and second LP structures may both couple to the alignment member. Also optionally, the LP structure may include only one light-propagating path or a plurality of light-propagating paths that are spaced apart from each other.

In another embodiment, a connector assembly is provided that is configured to be positioned relative to a light-emitting-diode (LED) that faces in a direction along a mounting axis. The connector assembly includes a receptacle connector that has a member cavity and a pair of opposite housing sides that extend along the mounting axis. The connector assembly also includes a light pipe (LP) structure that has input and output ends. The input end is configured to capture light emitted from the light-emitting element. The LP structure is movably engaged to at least one of the housing sides of the receptacle connector. The connector assembly also includes an alignment member that is attached to the LP structure and is confined within the member cavity of the receptacle connector. The member cavity is shaped relative to the alignment member to permit the alignment member to float in a direction along the mounting axis within the member cavity. The LP structure and the alignment member moves with respect to the receptacle connector along the mounting axis when the input end of the LP structure engages the light-emitting element.

DETAILED DESCRIPTION OF THE INVENTION

Figure 1:
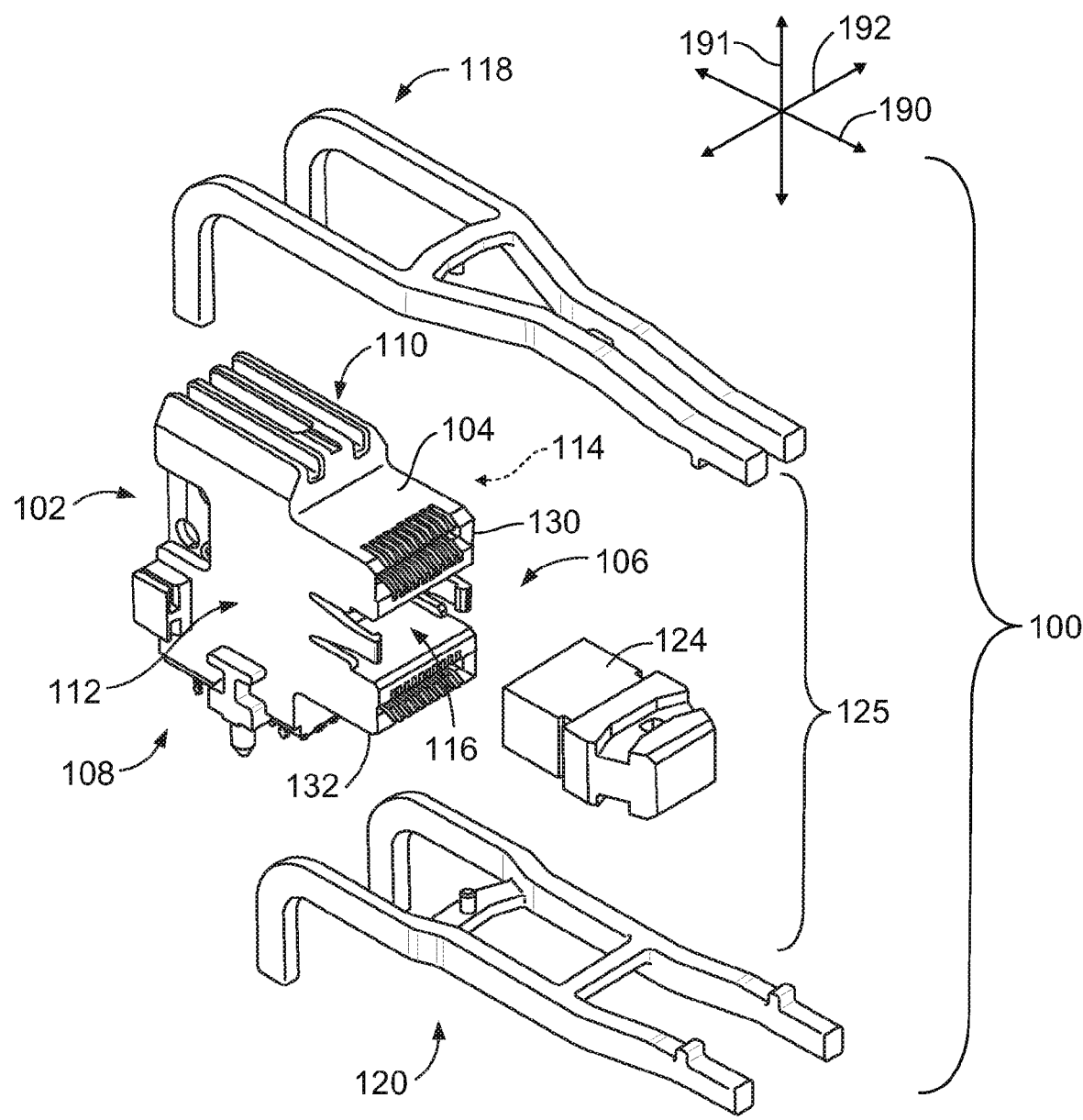
FIG. 1 is an exploded view of a connector assembly formed in accordance with one embodiment.

FIG. 1 is a perspective view of a connector assembly 100 formed in accordance with one embodiment. As shown, the connector assembly 100 is oriented with respect to mutually perpendicular axes 190-192 (i.e., a longitudinal axis 190, a mounting axis 191, and a lateral axis 192). The connector assembly 100 includes a receptacle connector 102 that has a connector housing 104. The connector housing 104 includes a front or mating end 106, a base 108 configured to be mounted to an electrical component, and a top portion 110. The connector housing 104 has a pair of opposite housing sides 112 and 114 that face in opposite directions along the lateral axis 192 and a member cavity 116 located between the opposite housing sides 112 and 114. The housing sides 112 and 114 may extend along a plane formed by the longitudinal and mounting axes 190 and 191. The member cavity 116 may open to the mating end 106 in a direction along the longitudinal axis 190. The connector assembly 100 also includes a light pipe (LP) assembly 125 having a pair of LP structures 118 and 120 that are configured to be movably engaged to the housing sides 112 and 114. In addition, the light pipe assembly 125 may include an alignment member 124 that is sized and shaped to be received by and confined within the member cavity 116. The alignment member 124 is configured to be attached to the LP structures 118 and 120.

The alignment member 124 and the member cavity 116 are shaped relative to each other so that the alignment member 124 is permitted to float within the member cavity 116. As such, the light pipe assembly 125 may float relative to the receptacle connector 102 to accommodate different spatial requirements or configurations of the connector assembly 100. For example, in some embodiments, the connector assembly 100 is configured to accommodate different light-emitting elements, such as the light-emitting elements 272 and 274 shown in FIG. 6. The light-emitting elements may be light-emitting diodes (LEDs). Different light-emitting elements may have various dimensions and, in particular, various heights from a surface of an electrical component, such as a circuit board 270 shown in FIG. 6. When the connector assembly 100 is mounted to a circuit board or another electrical component, the LP structures 118 and 120 may engage the light-emitting elements and float to a different position. As such, the alignment member 124 may facilitate controlling a relative position of the LP structures 118 and 120 with respect to the connector housing 104. In the illustrated embodiment, the alignment member 124 may float in a mounting direction (i.e., along the mounting axis 191). However, in other embodiments, the alignment member 124 may also be permitted to float or directed to float in other directions.

Also shown in FIG. 1, the receptacle connector 102 may include a pair of module ports 130 and 132. The module ports 130 and 132 are configured to receive removable or pluggable communication modules (not shown) that are moved into the module ports 130 and 132 along the longitudinal axis 190. In the illustrated embodiment, the receptacle connector 102 has two module ports 130 and 132. However, in alternative embodiments, the receptacle connector 102 may include only one module port or more than two module ports. During operation of the connector assembly 100, the LP assembly 125 may transmit light through the LP structures 118 and 120 to indicate whether the communication module(s) is communicatively engaged with the module ports 130 and 132.

Figure 2:
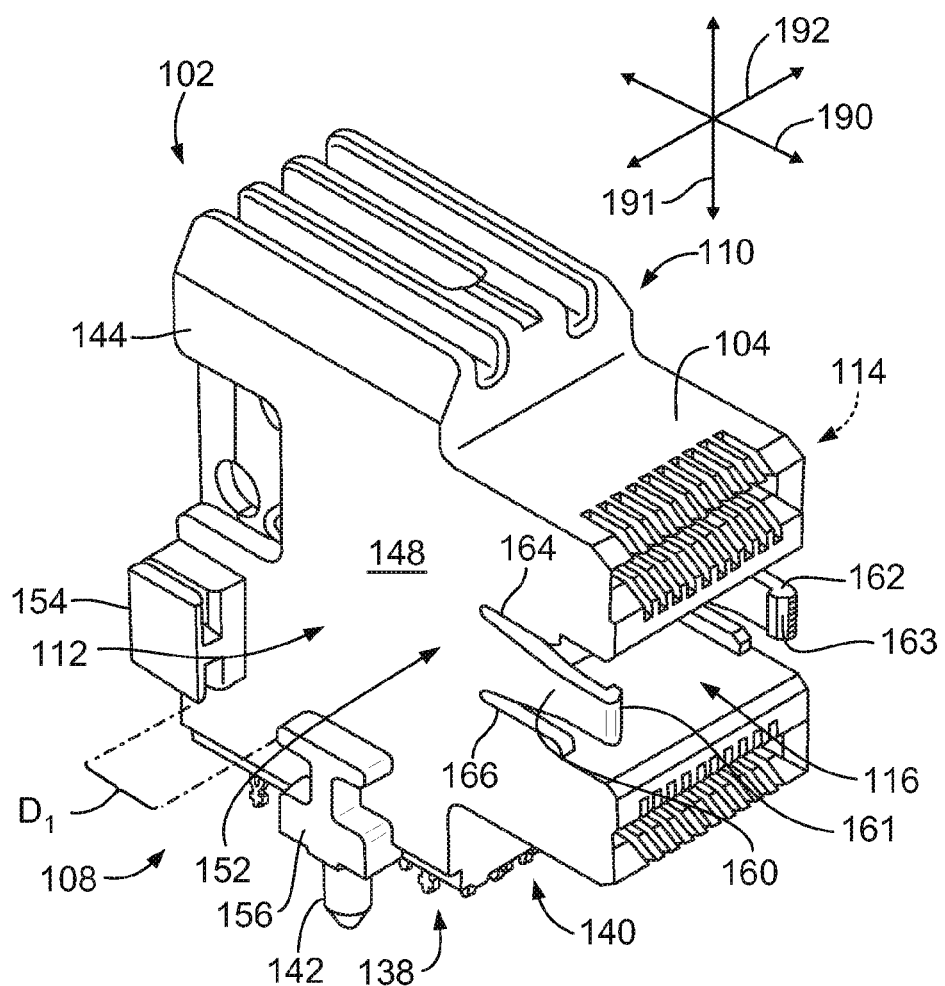
FIG. 2 is an isolated perspective view of a receptacle connector that may be used with the connector assembly of FIG. 1.
Figure 6:
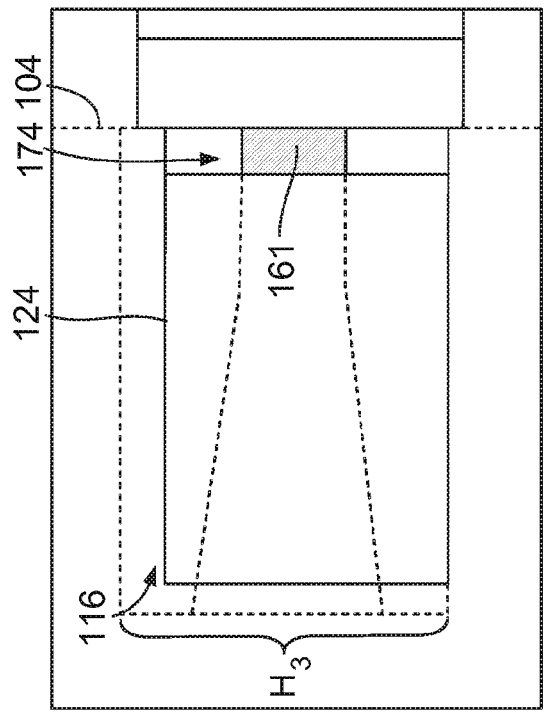
FIG. 6 is a side view of the connector assembly during a mounting operation.

FIG. 2 is an isolated perspective view of the receptacle connector 102. The base 108 includes a mounting face 138 that is configured to interface with a surface of the circuit board 270 (FIG. 6). As shown, the base 108 may include a plurality of contact tails 140 that project from the mounting face 138 in a direction along the mounting axis 191. The contact tails 140 may be inserted into corresponding through-holes (not shown) of the circuit board 270. Furthermore, the base 108 may include one or more posts 142 that also project from the mounting face 138 in a direction along the mounting axis 191. The posts 142 may be inserted into corresponding holes or bores of the circuit board 270 to orient the receptacle connector 102.

Although the following description is with reference to the housing side 112, the housing side 114 may also include similar features. In the illustrated embodiment, the housing side 112 may include a sidewall 144 having a corresponding side surface 148. The side surface 148 may be substantially planar in desired portions to facilitate mounting the LP structures 118 and 120 (FIG. 1). The side surface 148 may have an engagement section 152 that is configured to permit the LP structures 118 to 120 to be positioned along the housing side 112. The engagement section 152 may extend from the top portion 110 toward the base 108. For example, the side surface 148 may be substantially smooth and not include any features that project laterally therefrom in the engagement section 152 that would prevent the LP structures 118 and 120 from being mounted. Also shown, the housing side 112 may include one or more retaining features that are configured to hold or retain the LP structures 118 and 120. For example, the housing side 112 may include positive stops 154 and 156. The positive stops 154 and 156 may be spaced apart from each other by a longitudinal distance $D_1$. The positive stops 154 and 156 may be configured to control longitudinal movement of the LP structures 118 and 120 when mounted to the receptacle connector 102.

Also shown in FIG. 2, the housing sides 112 and 114 may have grip elements 160 and 162. The grip elements 160 and 162 are configured to engage the alignment member 124 and hold the alignment member 124 within the member cavity 116. The grip elements 160 and 162 may at least partially define the member cavity 116. When the alignment member 124 is within the member cavity 116, the alignment member 124 may be confined within the member cavity 116 by the grip elements 160 and 162. In some embodiments, the grip elements 160 and 162 are formed from the respective sidewalls of the housing sides 112 and 114. For example, the side surface 148 may include a pair of slits 164 and 166 that define the grip element 160. The grip elements 160 and 162 may be configured to deflect away from each other when the alignment member 124 is inserted into the member cavity 116. Also shown, the grip elements 160 and 162 may include respective protrusions 161 and 163 that project inwardly and toward each other across the member cavity 116. The protrusions 161 and 163 may be configured to engage the alignment member 124 to facilitate holding the alignment member within the member cavity 116. In addition, the protrusions 161 and 163 may be shaped to permit the alignment member 124 to be inserted into the member cavity 116.

In alternative embodiments, the grip elements 160 and 162 are not formed from the respective sidewalls of the housing sides 112 and 114. For example, the grip elements 160 and 162 may be resilient fingers or spring elements located within the member cavity 116. When the alignment member 124 is inserted into the member cavity 116, the resilient fingers may be deflected away from each other. When the alignment member 124 advances to a predetermined position within the member cavity 116, the resilient fingers may spring into, for example, recesses of the alignment member 124 to hold the alignment member 124 within the member cavity 116.

Figure 3:
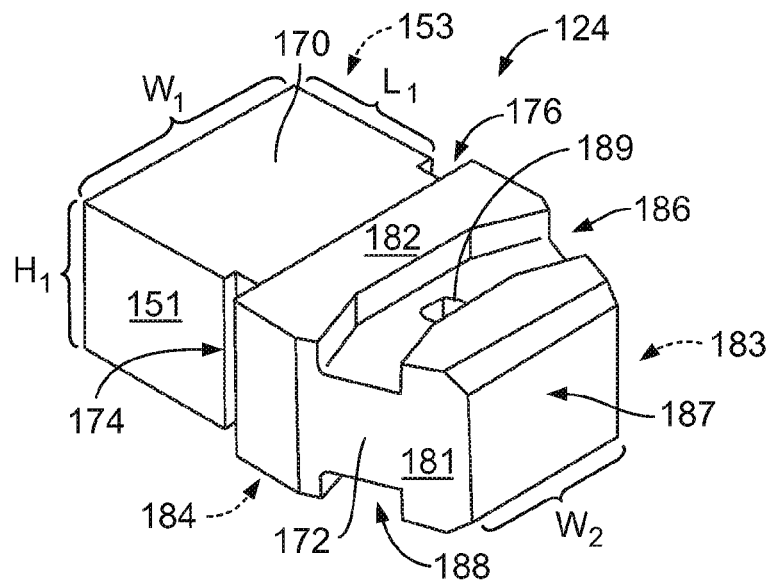
FIG. 3 is an isolated perspective view of an alignment member that may be used with the connector assembly of FIG. 1.

FIG. 3 is an isolated perspective view of the alignment member 124. As shown, the alignment member 124 includes an insert portion 170 and a light pipe (LP) coupling portion 172. The insert portion 170 is configured to be inserted into the member cavity 116 (FIG. 2). The insert portion 170 may have dimensions that permit the alignment member 124 to float with respect to the receptacle connector 102 (FIG. 1). For example, the insert portion 170 may be substantially block-shaped. The insert portion 170 may have a height $H_1$, a width $W_1$, and a length $L_1$ that are configured with respect to the dimensions of the member cavity 116. The insert portion 170 may also include one or more member recesses, such as member recesses 174 and 176. The member recesses 174 and 176 may be sized and shaped relative to the protrusions 161 and 163 (FIG. 2). As shown, the member recesses 174 and 176 open up and face opposite directions along the lateral axis 192 (FIG. 1). Furthermore, when located in the member cavity 116, the member recesses 174 and 176 may extend in a direction along the mounting axis 191 (FIG. 1).

The LP-coupling portion 172 is configured to couple to the LP structures 118 and 120 (FIG. 1). The LP-coupling portion 172 has opposite facing side surfaces 181 and 183 and opposite facing engagement surfaces 182 and 184. The engagement surface 182 and 184 may face in opposite directions along the mounting axis 191 (FIG. 2). As shown, the LP-coupling portion 172 may be shaped to taper as the LP-coupling portion 172 extends longitudinally away from the insert portion 170. For example, a forward-facing end 187 of the alignment member 124 may have a width $W_2$ that is substantially less than the width $W_1$. The engagement surfaces 182 and 184 include respective member channels 186 and 188 that extend between the side surfaces 181 and 183. The member channels 186 and 188 are configured to receive portions of the LP structures 118 and 120. The member channels 186 and 188 may have non-linear shapes or, alternatively, may extend parallel to the lateral axis 192. As shown, each member channel 186 and 188 may also include a coupling cavity 189.

Figure 4:
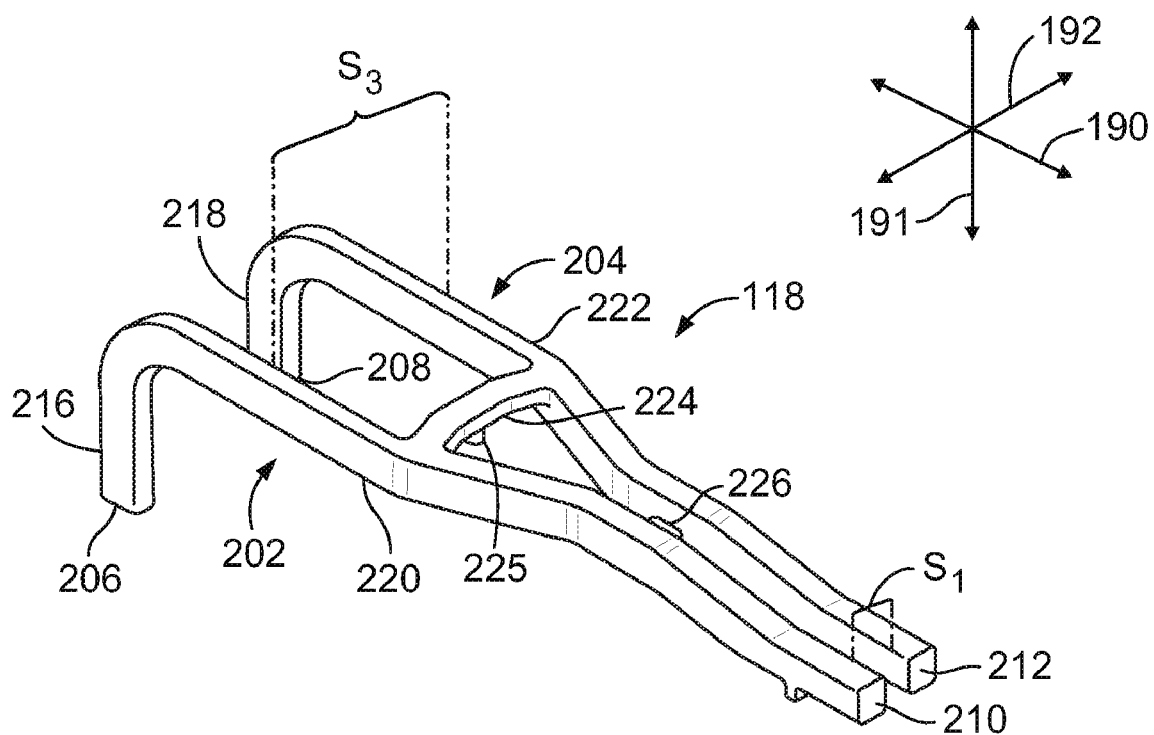
FIG. 4 is a perspective view of a pair of light pipe structures that may be used with the connector assembly of FIG. 1.
Figure 4:
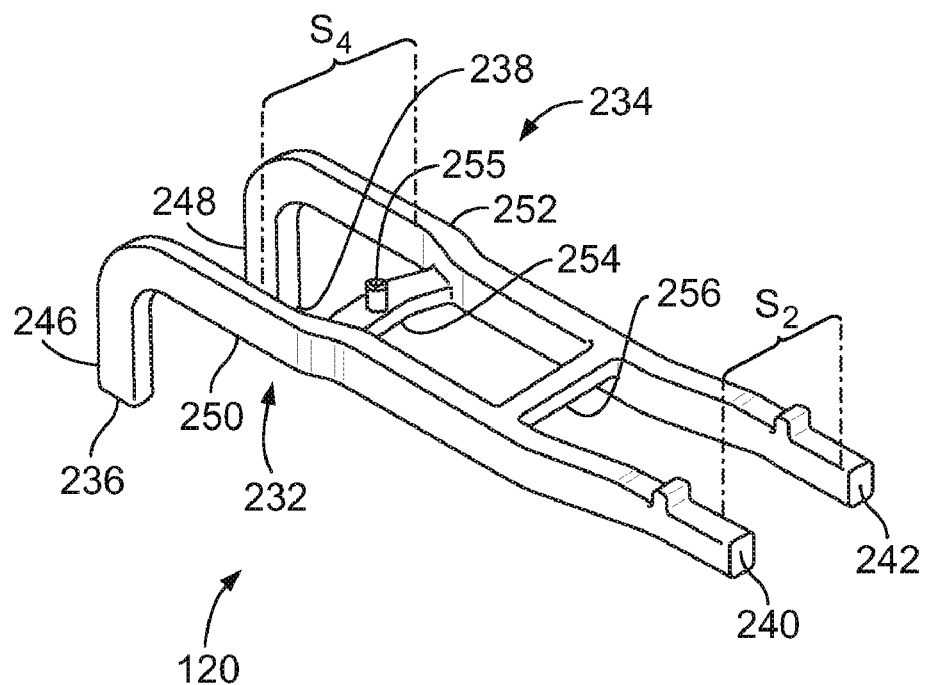

FIG. 4 is a perspective view of the LP structures 118 and 120. As shown, the LP structure 118 includes a pair of spaced apart light pipes or light-propagating paths 202 and 204. The light-propagating path 202 extends from an input end 206 to an output end 210, and the light-propagating path 204 extends from an input end 208 to an output end 212. The input ends 206 and 208 are configured to capture light from light-emitting elements, such as LEDs. The light-propagating paths 202 and 204 direct the light toward the output ends 210 and 212. During operation, the output ends 210 and 212 may be located in a region that is viewable to an operator.

The light-propagating paths 202 and 204 include mounting portions 216 and 218, respectively. The mounting portions 216 and 218 extend in a direction along the mounting axis 191. The mounting portions 216 and 218 are coupled to longitudinal portions 220 and 222 that extend in a direction along the longitudinal axis 190. In the illustrated embodiment, the mounting portions 216 and 218 and the longitudinal portions 220 and 222 are substantially perpendicular to each other.

The LP structure 118 may also include at least one bridge portion that joins the longitudinal portions 220 and 222 and provides structural integrity to the light-propagating paths 202 and 204. For example, the LP structure 118 includes bridge portions 224 and 226. The bridge portion 224 may be shaped relative to the member channel 186 (FIG. 3). As shown, the bridge portion 224 includes a fastener post 225 that projects therefrom in a direction along the mounting axis 191. As shown, the mounting portions 216 and 218 may be separated by a spacing $S_3$. The spacing $S_3$ may be substantially uniform from the input ends 206 and 208 to the bridge portion 224 and configured to permit the connector housing 104 (FIG. 1) to slide between the mounting portions 216 and 218 and the longitudinal portions 220 and 222.

The light-propagating paths 202 and 204 may have various shapes and configurations. For example, as shown, the longitudinal portions 220 and 222 may curve or extend toward each other as the longitudinal portions 220 and 222 extend to the respective output ends 210 and 212. The longitudinal portions 220 and 222 may be separated by a spacing $S_1$ from proximate to the bridge portion 226 to the output ends 210 and 212. In addition, the longitudinal portions 220 and 222 may extend along the mounting axis 191 in a gradual manner to change an elevation of the output ends 210 and 212.

Likewise, the LP structure 120 may include a pair of spaced apart light pipes or light-propagating paths 232 and 234. The light-propagating path 232 extends from an input end 236 to an output end 240, and the light-propagating path 234 extends from an input end 238 to an output end 242. The light-propagating paths 232 and 234 include mounting portions 246 and 248, respectively. The mounting portions 246 and 248 are coupled to longitudinal portions 250 and 252. In the illustrated embodiment, the mounting portions 246 and 248 and the longitudinal portions 250 and 252 are substantially perpendicular to each other. The LP structure 120 may also include at least one bridge portion that joins the longitudinal portions 250 and 252. For example, the LP structure 120 includes bridge portions 254 and 256. The bridge portion 254 may be shaped relative to the member channel 188 (FIG. 3). As shown, the bridge portion 254 includes a fastener post 255 that projects therefrom in a direction along the mounting axis 191.

The light-propagating paths 232 and 234 may have shapes and configurations that are different than the shapes and configurations of the light-propagating paths 202 and 204 of the LP structure 118. For example, as shown, the longitudinal portions 250 and 252 may be substantially parallel to each other as the longitudinal portions 250 and 252 extend to the respective output ends 240 and 242. Furthermore, the longitudinal portions 250 and 252 may have a greater length than longitudinal portions 220 and 222.

Also shown, the mounting portions 246 and 248 may be separated by a spacing $S_4$. The spacing $S_4$ may be substantially uniform from the input ends 236 and 238 to the bridge portion 254 and configured to permit the connector housing 104 (FIG. 1) to slide between the mounting portions 246 and 248 and the longitudinal portions 250 and 252. The spacings S3 and S4 may be substantially equal to each other. When the LP structures 118 and 120 are coupled to the alignment member 124, the LP structures 118 and 120 form a connector-reception region that is sized and shaped relative to a width of the receptacle connector 102 (FIG. 1) so a portion of the receptacle connector 102 may be located therein.

Figure 5:
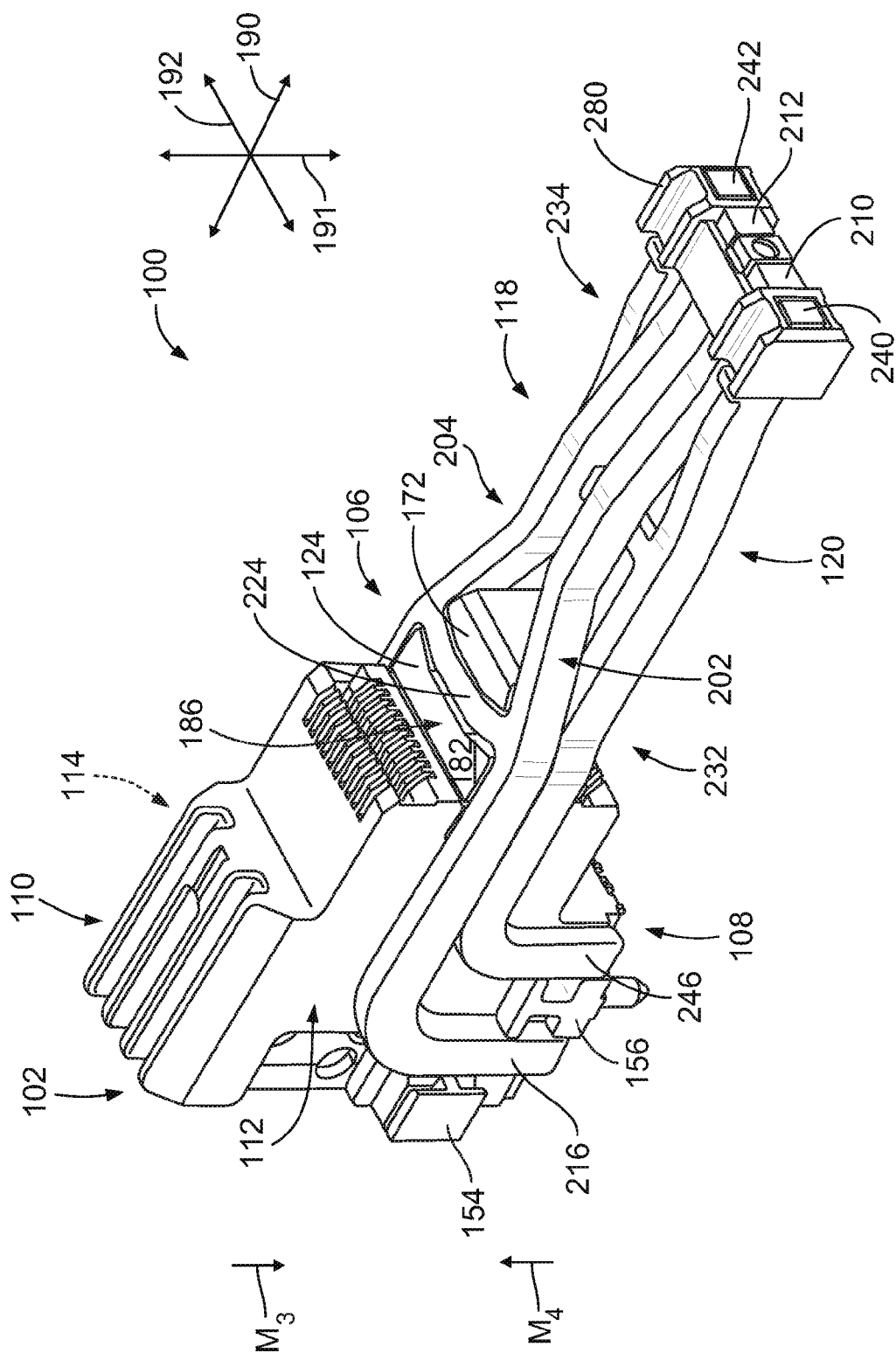
FIG. 5 is a perspective view of the connector assembly fully assembled.

The LP structures 118 and 120 may be configured so that the output ends 210 and 212 and the output ends 240 and 242 have desired spatial relationships. For example, the longitudinal portions 250 and 252 may be separated by a spacing $S_2$ from proximate to the bridge portion 254 to the output ends 240 and 242. The spacing $S_2$ is greater than the spacing $S_1$ so that the output ends 210 and 212 may be located between the output ends 240 and 242. In addition, the longitudinal portions 250 and 252 may extend along the mounting axis 191 in a gradual manner to change an elevation of the output ends 240 and 242. As shown in FIG. 5, the output ends 210 and 212 and the output ends 240 and 242 are arranged side-by-side in a linear fashion along the lateral axis 192.

However, FIG. 4 illustrates only one possible configuration of the LP structures 118 and 120, and the LP structures 118 and 120 may have different configurations in other embodiments. In alternative embodiments, the connector assembly includes only one LP structure, such as the LP structures 118 and 120. Furthermore, in other embodiments, the LP structure (s) may include only one light-propagating path or more than two light-propagating paths. If only one light-propagating path (or light pipe) is used in a LP structure, the bridge portion 224 or the bridge portion 254 may function as a fastening portion to couple the corresponding light-propagating path to the alignment member.

FIG. 5 is a perspective view of the connector assembly 100 fully assembled. To construct the connector assembly 100, the insert portion 170 (FIG. 3) of the alignment member 124 may be advanced into the member cavity 116 (FIG. 1). As the alignment member 124 is moved along the longitudinal axis 190 toward the mating end 106, the insert portion 170 engages the grip elements 160 and 162 (FIG. 2). Specifically, the protrusions 161 and 163 (FIG. 2) may engage the insert portion 170. The grip elements 160 and 162 are deflected away from each other. The protrusions 161 and 163 may slide along side surfaces 151 and 153 (FIG. 3) of the insert portion 170. The protrusions 161 and 163 are shaped relative to the member recesses 174 and 176 (FIG. 3), respectively.

When the alignment member 124 arrives at a desired position within the member cavity 116, the grip elements 160 and 162 may flex toward each other and slidable engage the member recesses 174 and 176. In the illustrated embodiment, the insert portion 170 is positioned within the member cavity 116 and the LP-coupling portion 172 projects away from the mating end 106 and is located in an exterior space of the receptacle connector 102 when the alignment member 124 is fully inserted. As such, the alignment member 124 projects beyond the member cavity 116 into the exterior space and the alignment member 124 or, more specifically, the LP-coupling portion 172 engages the LP structures 118 and 120 in the exterior space.

However, in alternative embodiments, the alignment member 124 may be fully inserted into the member cavity 116 or, in other embodiments, may be substantially or completely external to the connector housing 104. For example, the alignment member 124 may attach to an external surface of the connector housing 104 using one or more coupling mechanisms.

After inserting the alignment member 124 into the member cavity 116, the LP structures 118 and 120 may be coupled to the alignment member 124. For example, the LP structure 118 may be mounted to the alignment member 124 so that the member channel 186 receives the bridge portion 224. The coupling cavity 189 (FIG. 3) may receive and form an interference fit with the fastener post 225 (FIG. 4). Likewise, the coupling cavity (not shown) of the member channel 188 (FIG. 3) may receive and form an interference fit with the fastener post 255 (FIG. 4) when the LP structure 120 is coupled to the alignment member 124. The bridge portions 224 and 254 may be shaped to have a snug fit within the corresponding member channels 186 and 188. As shown in FIG. 5, the engagement surface 182 may be substantially flush with the bridge portion 224. Although not shown, the mounting surface 184 (FIG. 3) may also be substantially flush with the bridge portion 254 (FIG. 4). Accordingly, the LP structures 118 and 120 may be coupled to the alignment member 124 and held in fixed positions with respect to each other.

Also shown in FIG. 5, the retaining features may be located along the housing sides 112 and 114 to permit the LP structures 118 and 120 to be mounted to the receptacle connector 102 and coupled to the alignment member 124. More specifically, the positive stops 154 and 156 may be positioned so that LP structure 118 may be moved in an engagement direction $M_3$ from the top portion 110 toward the base 108 onto the alignment member 124. The spacing $S_3$ (FIG. 4) that separates the mounting portions 216 and 218 (FIG. 4) is sized to allow the light-propagating paths 202 and 204 to slide along the housing sides 112 and 114. When the light-propagating paths 202 and 204 slide along the housing sides 112 and 114, the mounting portions 216 and 218 are inserted between the positive stops 154 and 156. (FIG. 5 only illustrates the mounting portion 216 being inserted between the positive stops 154 and 156. However, the mounting portion 218 may also be inserted between positive stops on the housing side 114 that may be configured similar to positive stops 154 and 156.)

The LP structure 120 may be moved in an engagement direction $M_4$ from the base 108 to the top portion 110 to couple to the alignment member 124. Likewise, the spacing $S_4$ (FIG. 4) that separates the mounting portions 246 and 248 (FIG. 4) is sized to allow the light-propagating paths 232 and 234 to slide along the housing sides 112 and 114. The mounting portion 246 is located in front of the positive stop 156 proximate to the mating end 106. Thus, the LP structures 118 and 120 may have a stacked relationship with respect to each other when the connector assembly 100 is fully assembled. More specifically, the LP structures 118 and 120 may be directly stacked together such that the LP structures 118 and 120 contact each other as shown in FIG. 5. Also shown in FIG. 5, the output ends 240, 210, 212, and 242 may be positioned within and held by a cap member 280.

Figure 7:
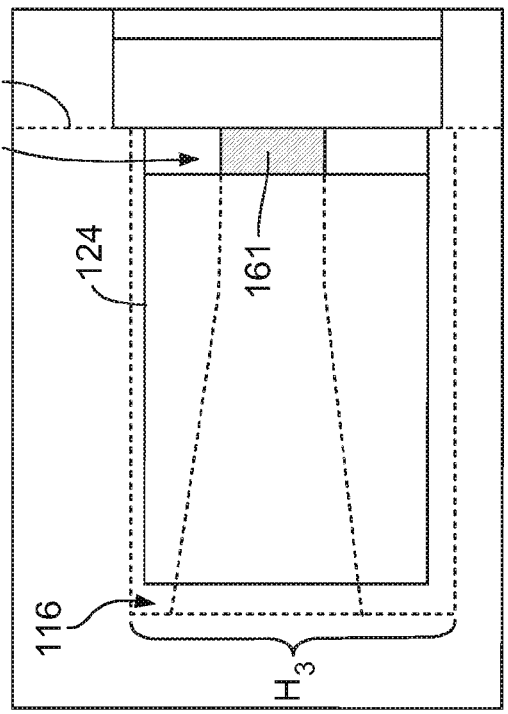
FIG. 7 is a side view of the connector assembly mounted onto an electrical component having light-emitting elements.
Figure 8:
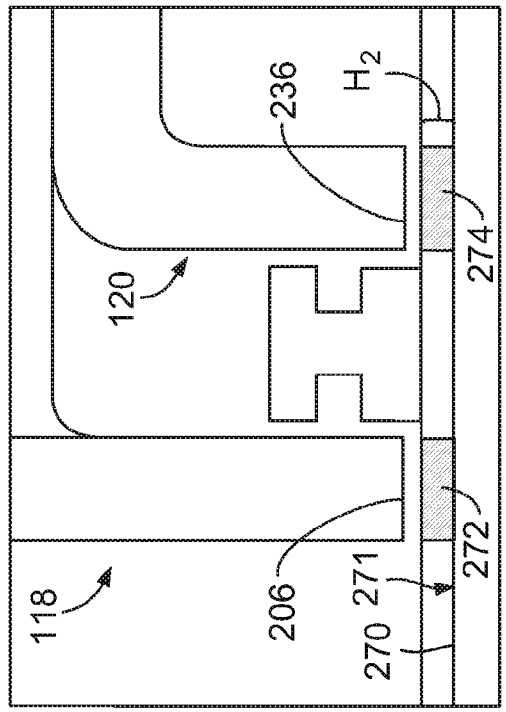
FIG. 8 is a side view of the alignment member during a mounting operation.
Figure 9:
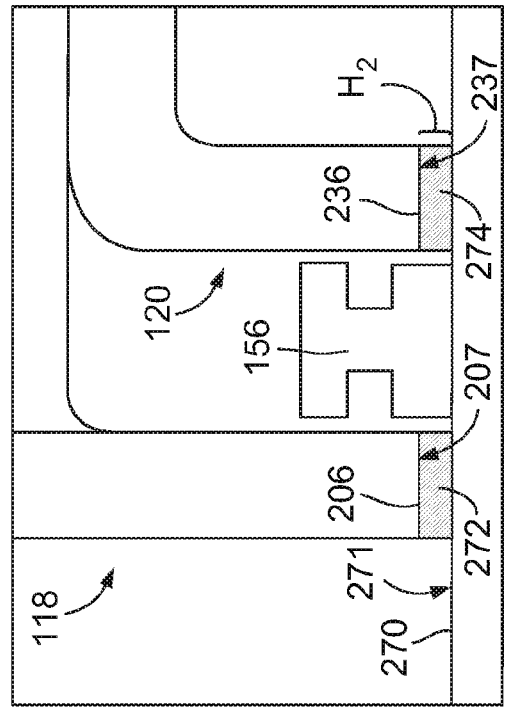
FIG. 9 is a side view of the alignment member floating within a member cavity.

FIGS. 6-9 illustrate the floatability of the LP assembly 125 (FIG. 1) during a mounting operation in greater detail. FIGS. 6 and 7 are side views of the connector assembly 100 (FIG. 1) during the mounting operation that shows the input ends 206 and 236 of the LP structures 118 and 120 engaging corresponding light-emitting elements 272 and 274, respectively, of a circuit board 270 having a board surface 271. The light-emitting elements 272 and 274 may be LEDs. FIGS. 8 and 9 are side views of the alignment member 124 within the member cavity 116 during the mounting operation. (For illustrative purposes, the LP structures 118 and 120 in FIGS. 8 and 9 have been removed and the connector housing 104 is represented by dashed lines). In some embodiments, when the connector assembly 100 is mounted to the circuit board 270, the input ends 206 and 236 may engage the light-emitting elements 272 and 274. The floating alignment member 124 may be configured to accommodate different heights $H_2$ of the light-emitting elements.

More specifically, when the connector assembly 100 is mounted toward the circuit board 270, the input ends 206 and 236 may engage the light-emitting elements 272 and 274 as the LP structures 118 and 120 are moved along the mounting axis 191 (FIG. 1) in a mounting direction $M_1$ (FIG. 6). If the connector assembly 100 continues to move in the mounting direction $M_1$ after the input ends 206 and 236 have engaged the light-emitting elements 272 and 274, the LP structures 118 and 120 may be pushed or raised in a elevated direction $M_2$ (FIG. 7), which is opposite to the mounting direction $M_1$. As such, the alignment member 124 may float with respect to the mating end 106 of the receptacle connector 102. While the receptacle connector 102 moves with respect to the circuit board 270, the alignment member 124 may have a substantially stationary position with respect to the circuit board 270.

As shown in FIGS. 8 and 9, the alignment member 124 and the member cavity 116 are sized and shaped relative to each other so that the alignment member 124 may move or float within the member cavity 116. For example, the member cavity 116 may have a height $H_3$ that is greater than the height $H_1$ (FIG. 3). The member cavity 116 may also have other dimensions (e.g., length and width) that are greater than the corresponding dimensions of the alignment member 124.

The member recesses 174 and 176 and the protrusions 161 and 163 (only the member recess 174 and protrusion 161 are shown in FIGS. 8 and 9) may cooperate with one another to direct the alignment member 124 to float along the mounting axis 191 (FIG. 1). The alignment member 124 may float in a linear direction. When the alignment member 124 floats within the member cavity 116, the alignment member 124 may have a substantially stationary position with respect to the board surface 271. As shown in FIG. 7, after the connector assembly 100 is fully mounted, the input ends 206 and 236 of the LP structures 118 and 120 may rest on top of the light-emitting elements 272 and 274. More specifically, the input ends 206 and 236 are configured to face the light-emitting elements 272 and 274 in a direction along the mounting axis 191 (FIG. 1). A gravitational force $F_G$ may pull the LP structures 118 and 120 in a gravitational force direction (as indicated by the arrow) so that the input ends 206 and 236 maintain communicative interfaces 207 and 237 with the light-emitting elements 272 and 274. The communicative interfaces 207 and 237 facilitate capturing light emitted from the light-emitting elements 272 and 274. Furthermore, as shown in FIG. 7, the positive stop 156 may prevent longitudinal movement of the LP structures 118 and 120 in a direction along the longitudinal axis 190 (FIG. 1).

In alternative embodiments, the alignment member 124 may be configured to float in directions other than the mounting direction $M_1$ or the elevated direction $M_2$. For example, the protrusions 161 and 163 and the member recesses 174 and 176 may be shaped to shift the alignment member 124 in a lateral direction as the alignment member 124 is raised in the elevated direction $M_2$. Likewise, the protrusions 161 and 163 and the member recesses 174 and 176 may be shaped to shift the alignment member 124 in a longitudinal direction (forward or backward) as the alignment member 124 is raised in the elevated direction $M_2$. As such, the alignment member 124 may be sized to float within the member cavity 116 to control a relative position of the input ends 206 and 236 of the LP structures 118 and 120 with respect to the base 108 (FIG. 1).

It is to be understood that the above description is intended to be illustrative, and not restrictive. As such, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly comprising:
   a receptacle connector having a member cavity and a base configured to be mounted to a surface of an electrical component having a light-emitting element;
   a light pipe (LP) structure having input and output ends, the input end configured to capture light emitted from the light-emitting element; and
   an alignment member received within the member cavity of the receptacle connector and being secured to the LP structure such that the LP structure and the alignment member move with each other relative to the receptacle connector, wherein the alignment member is sized to float within the member cavity when the input end engages the light-emitting element as the receptacle connector is mounted to the surface of the electrical component.

2. The connector assembly in accordance with claim 1, wherein the input end is configured to face the light-emitting element in a direction along a mounting axis, the member cavity opening in a direction along a longitudinal axis that is perpendicular to the mounting axis.

3. The connector assembly in accordance with claim 1, wherein the receptacle connector includes a grip element that at least partially defines the member cavity, the grip element being deflected by the alignment member when the alignment member is inserted into the member cavity.

4. The connector assembly in accordance with claim 1, wherein the input end is configured to face the light-emitting element in a direction along a mounting axis, the alignment member having a member recess, the member recess having a greatest dimension that extends substantially parallel to the mounting axis when the alignment member is positioned within the member cavity, the receptacle connector including a protrusion that is received in the member recess and configured to slide therein so that the alignment member is floatable along the mounting axis.

5. The connector assembly in accordance with claim 1, wherein the alignment member projects beyond the member cavity into an exterior space of the receptacle connector, the alignment member coupling to the LP structure in the exterior space.

6. The connector assembly in accordance with claim 1, wherein the LP structure includes first and second light-propagating paths that transmit light from corresponding light-emitting elements, the first and second light-propagating paths extending substantially parallel to one another from the receptacle connector.

7. The connector assembly in accordance with claim 1, wherein the receptacle connector includes first and second module ports configured to pluggably engage respective communication modules, the member cavity being located between the first and second module ports.

8. The connector assembly in accordance with claim 1, wherein the alignment member is inserted into the member cavity by advancing in an insertion direction, the alignment member being floatable in a mounting direction that is perpendicular to the insertion direction.

9. The connector assembly in accordance with claim 1, wherein the alignment member moves in a substantially linear manner along a mounting axis when floating.

10. A connector assembly configured to be positioned relative to a light-emitting element that faces in a direction along a mounting axis, the connector assembly comprising:
    a receptacle connector having a member cavity and a pair of opposite housing sides that extend along the mounting axis, the receptacle connector including a base and a top portion that face in opposite directions, the base configured to be mounted to a surface of an electrical component having the light-emitting element, the top portion defining a height of the receptacle connector that is measured along the mounting axis;
    a light pipe (LP) structure having input and output ends, the input end configured to capture light emitted from the light-emitting element; and
    an alignment member secured to the LP structure and such that the LP structure and the alignment member move with each other relative to the receptacle connector, the alignment member being within the member cavity of the receptacle connector, wherein the member cavity is shaped relative to the alignment member to permit the alignment member to float in a direction along the mounting axis within the member cavity, the LP structure moving toward the top portion when the alignment member floats during a mounting operation between the receptacle connector and the electrical component.

11. The connector assembly in accordance with claim 10, wherein the member cavity opens in a direction along a longitudinal axis that is perpendicular to the mounting axis.

12. The connector assembly in accordance with claim 10, wherein the receptacle connector includes a grip element that at least partially defines the member cavity, the grip element being deflected by the alignment member when the alignment member is inserted into the member cavity.

13. The connector assembly in accordance with claim 10, wherein the alignment member has a member recess having a greatest dimension that extends substantially parallel to the mounting axis when the alignment member is positioned within the member cavity, the receptacle connector including a protrusion that is received in the member recess and configured to slide therein, the protrusion and the alignment member cooperating to direct the alignment member along the mounting axis.

14. The connector assembly in accordance with claim 10, wherein the alignment member projects beyond the member cavity into an exterior space of the receptacle connector, the alignment member attaching to the LP structure in the exterior space.

15. The connector assembly of claim 10, wherein the receptacle connector includes a front end that extends between the base and the top portion, the front end facing in a longitudinal direction along a longitudinal axis that is perpendicular to the mounting axis, wherein the LP structure includes a longitudinal portion that extends from the front end in the longitudinal direction to the output end such that the output end is located a distance away from the receptacle connector and the alignment member.

16. The connector assembly of claim 10, wherein the LP structure is not directly coupled to the receptacle connector, the LP structure being indirectly coupled to the receptacle connector via the alignment member.

17. The connector assembly of claim 1, wherein the receptacle connector has a front end that is configured to pluggably engage a communication module, the front end facing in a longitudinal direction along a longitudinal axis that extends parallel to the surface of the electrical component when the receptacle connector is mounted thereto, the LP structure having a longitudinal portion that extends from the front end in the longitudinal direction to the output end such that the output end is located a distance away from the receptacle connector and the alignment member.

18. The connector assembly of claim 1, wherein the LP structure is not directly coupled to the receptacle connector, the LP structure being indirectly coupled to the receptacle connector via the alignment member.

19. A connector assembly comprising:
a receptacle connector having opposite first and second housing sides that extend along perpendicular mounting and longitudinal axes, the receptacle connector having a front end that extends between the first and second housing sides, the receptacle connector having a member cavity;
an alignment member confined within the member cavity of the receptacle connector, the member cavity shaped relative to the alignment member to permit the alignment member to float along the mounting axis within the member cavity;
first and second light pipes secured to the alignment member and extending along the first and second housing sides, respectively, each of the first and second light pipes having input and output ends, the input ends configured to capture light emitted from corresponding light-emitting elements of an electrical component, each of the first and second light pipes extending from the front end in a direction along the longitudinal axis to the corresponding output end, wherein the alignment member and the first and second light pipes float relative to the receptacle connector when the input ends engage the corresponding light-emitting elements as the receptacle connector is mounted to a surface of the electrical component.

20. The connector assembly of claim 19, wherein the connector assembly includes a bridge portion that joins the first and second light pipes.

* * * * *